United States Patent [19]

Lu

[11] Patent Number: 5,531,350
[45] Date of Patent: Jul. 2, 1996

[54] THERMAL POT

[76] Inventor: Yao K. Lu, P.O. Box 82-144, Taiwan City, Taiwan

[21] Appl. No.: 489,231
[22] Filed: Jun. 12, 1995
[51] Int. Cl.$^6$ .................................................. A47J 41/00
[52] U.S. Cl. .......................... 220/421; 220/469; 220/912
[58] Field of Search .................................. 220/421, 425, 220/426, 430, 431, 444, 469, 912

[56] References Cited

U.S. PATENT DOCUMENTS

| | | | |
|---|---|---|---|
| 2,538,524 | 1/1951 | Joseph | 220/425 X |
| 3,094,448 | 6/1963 | Cornelius | 220/444 X |
| 3,120,570 | 2/1964 | Kennedy et al. | 220/444 X |
| 3,298,554 | 1/1967 | Piker | 220/444 X |
| 3,934,748 | 1/1976 | Racz | 220/431 X |
| 5,251,542 | 10/1993 | Itoh et al. | 220/912 X |
| 5,355,777 | 10/1994 | Chen et al. | 220/912 X |

Primary Examiner—Steven M. Pollard
Attorney, Agent, or Firm—Alfred Lei

[57] ABSTRACT

A thermal pot including a heat-insulative hollow shell having a top mounting groove and a bottom mounting flange, a rim having a mounting flange fastened to the top mounting groove on the shell by ultrasonic welding, a heat-insulative lining fastened to the inside of the shell and connected to the rim by a connecting member, a base covered on the shell and the lining at the bottom and having a mounting groove fastened to the bottom mounting flange of the shell by ultrasonic welding, the rim a plurality of stop blocks and retaining grooves around the periphery, the connecting member having a first coupling portion fastened to an endless bottom mounting groove on the rim by ultrasonic welding, a second coupling portion coupled to an inside lip on the shell, and a third coupling portion coupled to a top lip on said lining, a heat-insulative inner pot put in the space defined within said lining and having a pivoted handle for carrying, and a cover detachably covered on the shell over the inner pot, the cover having a handgrip at the top, a plurality of retaining strips for engagement with the retaining grooves on the rim by rotating the cover relative to the rim, and a spring-supported hook for engagement with one stop block on the rim to lock the cover in the closed position.

1 Claim, 4 Drawing Sheets

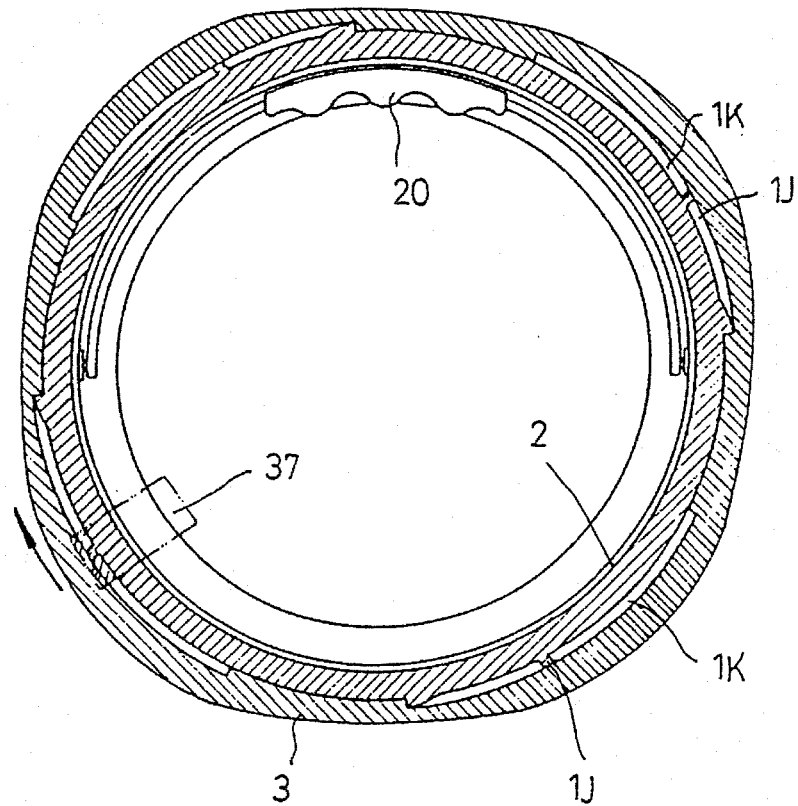
F I G. 3A
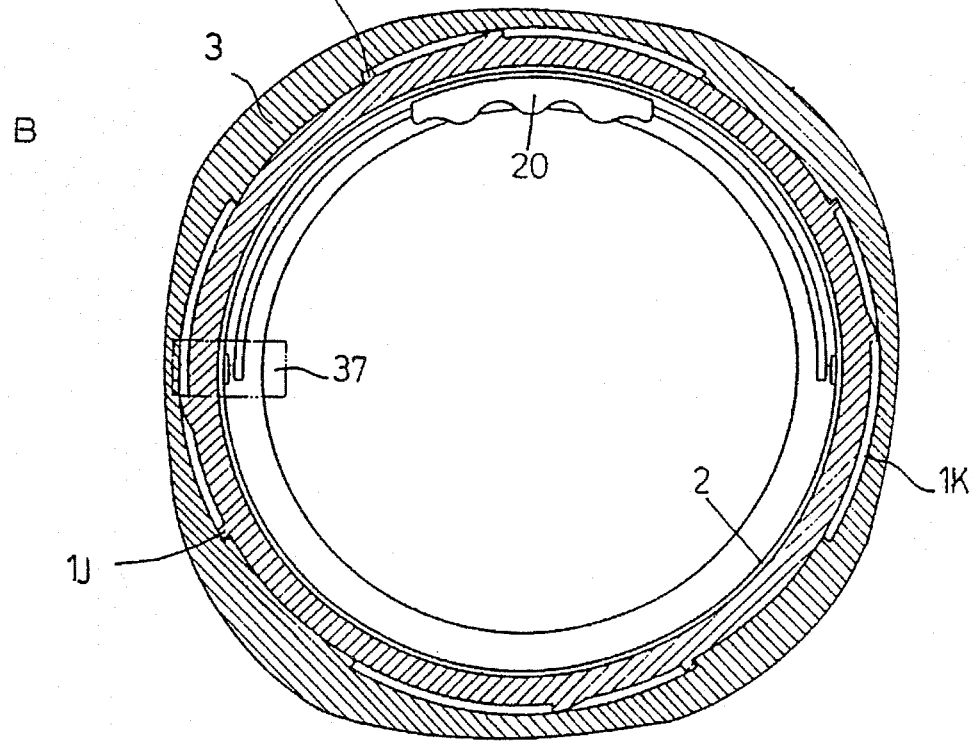
F I G. 3B

THERMAL POT

BACKGROUND OF THE INVENTION

1. Field of the Invention

The present invention relates to thermal pot, and relates more particularly to such a thermal pot which comprises a heat-insulative housing, a heat-insulative inner pot received in the housing and having a pivoted handle for carrying, and a cover fastened to the housing by a swivel joint.

2. Description of the Prior Art

Regular thermal pots are commonly comprised of a heat-insulative housing, a heat-insulative inner pot, and a cover. The heat-insulative housing is comprised of an outer shell, an inner shell, and a heat-insulative stuffing filled in between the shells, and a pair of handles secured to the shell. The inner shell is fastened to the outer shell by punching the respective top edges into hooked flanges hooked together. The cover has a handgrip at the top. The handgrip is fixedly secured to the cover at the top side by screws. This structure of thermal pot is complicated and expensive to manufacture. Another drawback of this structure of thermal pot is that the connection between the inner shell and the outer shell tend to vibrate, causing a leakage of heat. Furthermore, because the top cover is simply covered on the housing, it tends to fall from the housing when the housing is moved.

SUMMARY OF THE INVENTION

The present invention has been accomplished to provide a thermal pot which eliminates the aforesaid drawbacks. According to one aspect of the present invention, the thermal pot is comprised of a heat-insulative housing, a heat-insulative inner pot put in the heat-insulative housing, and a cover covered on the heat-insulative housing over the heat-insulative inner pot, wherein the heat-insulative housing comprises a hollow shell, a heat-insulative lining mounted around the inside wall of the hollow shell, a base covered on the hollow shell and the heat-insulative lining at a bottom side, and a rim fastened to the hollow shell and the heat-insulative lining at a top side by a connecting member, the hollow shell comprising an endless mounting groove around the topmost edge thereof, an endless mounting flange raised from the lowest bottom edge thereof, and an inside lip near the topmost edge, the base comprising an endless mounting groove fastened to the endless mounting flange on the hollow shell by ultrasonic welding, the rim comprising a downward mounting flange raised from a bottom side thereof and fastened to the endless mounting groove on the hollow shell by ultrasonic welding, an endless top mounting groove, an endless bottom mounting groove, and a top contact plate fastened to the top mounting groove on the rim, the heat-insulative lining having a coupling lip raised from a top side thereof, the connecting member comprising a first coupling portion fastened to the endless bottom mounting groove on the rim by ultrasonic welding, a second coupling portion coupled to the inside lip on the hollow shell, and a third coupling portion coupled to the top lip on the heat-insulative lining. According to another aspect of the present invention, the rim has a plurality of retaining grooves, and the cover has a plurality of retaining strips for connection to the retaining grooves on the rim through rotary motion. According to still another aspect of the present invention, the cover has a handgrip at the top side, which handgrip is fastened to the cover by hooked joints.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 3A is a top plain view of the thermal pot shown in FIG. 1 showing the cover unlocked from the housing;

FIG. 3B is similar to FIG. 3A but showing the cover locked; and

DETAILED DESCRIPTION OF THE PREFERRED EMBODIMENT

Figure 1:
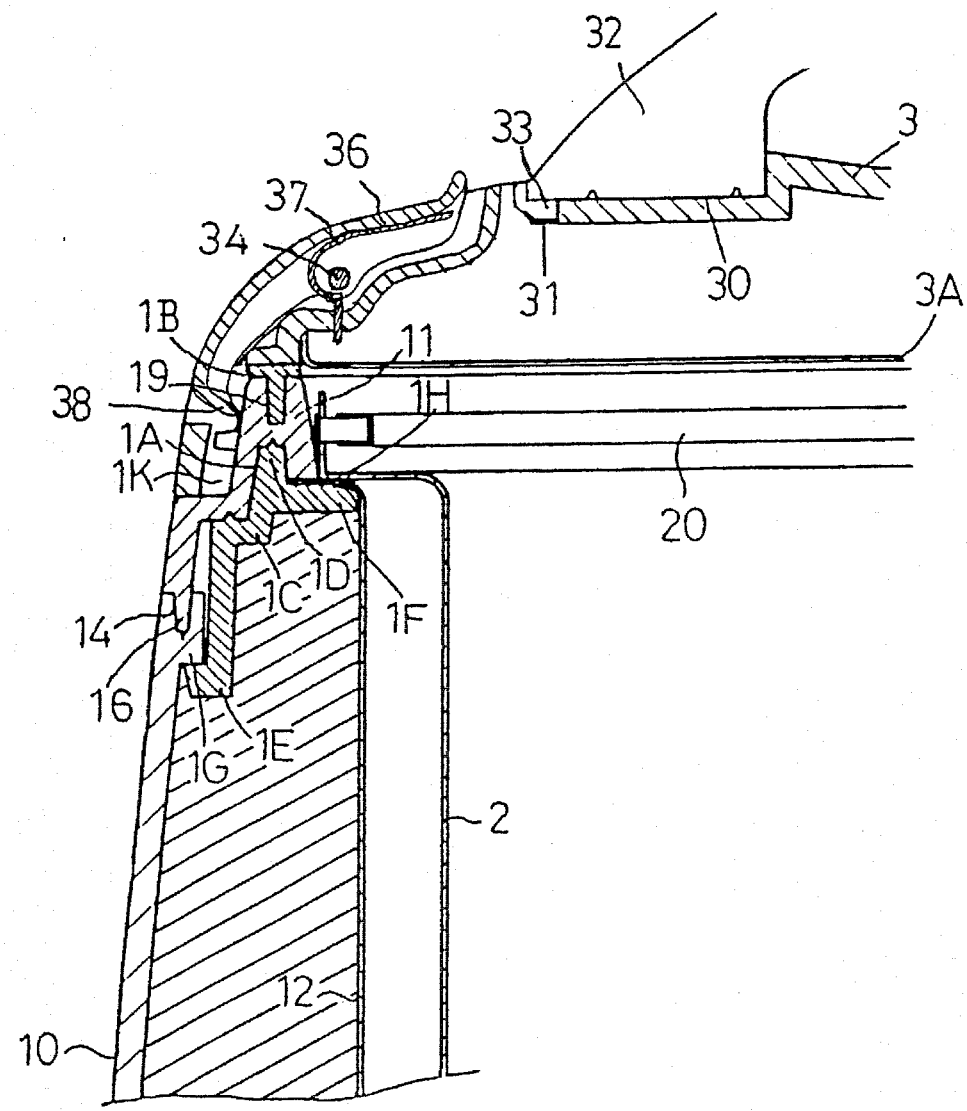
FIG. 1 is a partial view in section of a thermal pot according to the present invention.
Figure 1:
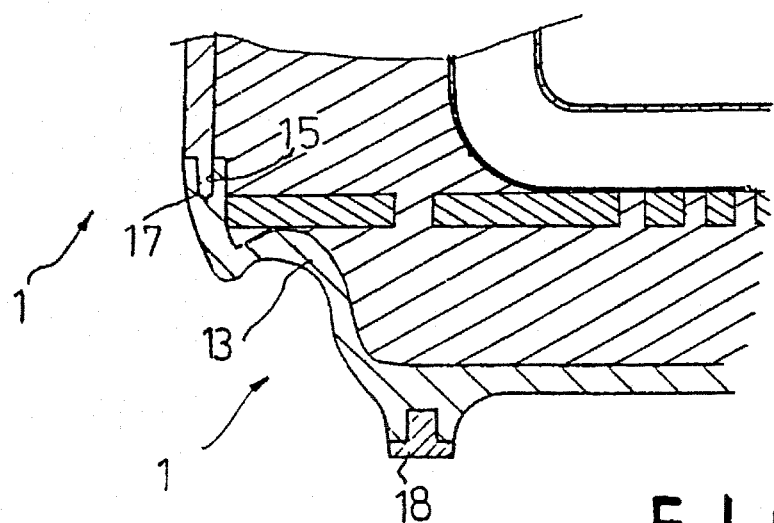

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
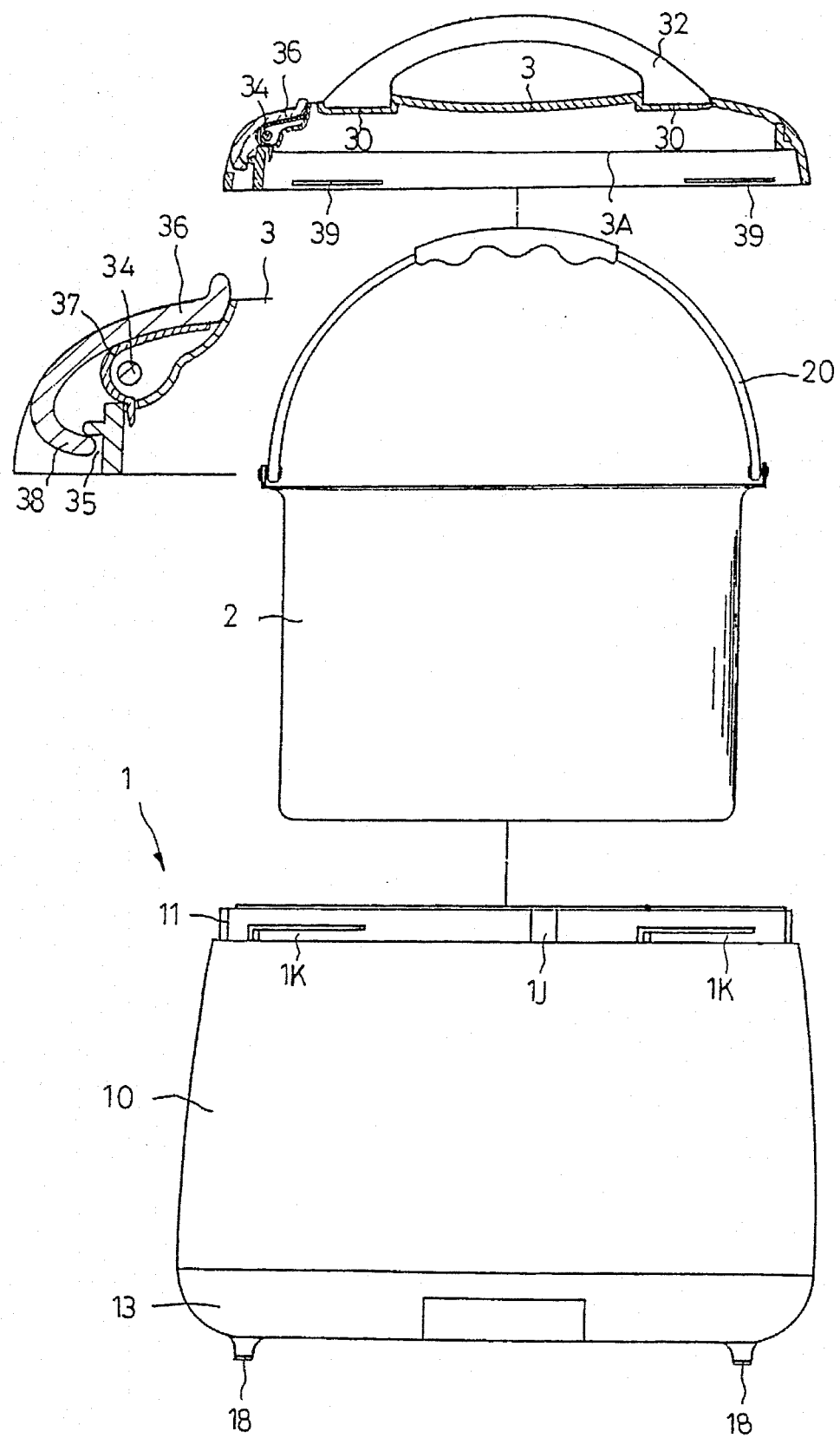
FIG. 2 is an exploded view of the thermal pot shown in FIG. 1.

Referring to FIGS. 1 and 2, a thermal pot in accordance with the present invention is generally comprised of a heat-insulative housing 1, a heat-insulative inner pot 2, and a cover 3. The heat-insulative housing 1 comprises a hollow shell 10, a heat-insulative lining 12 mounted around the inside wall of the hollow shell 10, a base 13 fastened to the hollow shell 10 and the heat-insulative lining 12 at the bottom, and a rim 11 fastened to the hollow shell 10 and the heat-insulative lining 12 at the top. The hollow shell 10 has an endless mounting groove 14 at the top around the border and an endless mounting flange 15 at the bottom around the border. The base 13 has an endless mounting groove 17 at the top around the border engaged with the endless mounting flange 15 on the hollow shell 10, and a plurality of stands with foot pads 18 at the bottom. When the endless mounting flange 15 is fitted into the endless mounting groove 17, the connecting area between the base 13 and the hollow shell 10 is sealed by a ultrasonic welding process. The rim 11 comprises a downward mounting flange 13 raised from the bottom side and fitted into the endless mounting groove 14 on the hollow shell 10 and then fixedly secured thereto by a ultrasonic welding process, a plurality of stop blocks 1J and retaining grooves 1K alternatively spaced around the periphery, an endless top mounting groove 19, and an endless bottom mounting groove 1A. A top contact plate 1B is fastened to the top mounting groove 19 of the rim 11. A connecting member 1C is connected between the rim 11 and the heat-insulative lining 12. The connecting member 1C comprises a first coupling portion 1D fastened to the endless bottom mounting groove 1A on the rim 11 by ultrasonic welding, a second coupling portion 1E coupled to an inside lip 1G at the top of the heat-insulative housing 10, and a third coupling portion 1F coupled to a top lip 1H on the heat-insulative lining 12. The heat-insulative inner pot 2 is put in the heat-insulative housing 1, having a pivoted handle 20 at the top for carrying by hand. Through the handle 20, the heat-insulative inner pot 2 can be conveniently carried out of the heat-insulative housing 1. The cover 3 comprises two recessed portions 30 spaced at the top, two retaining holes 31 respectively disposed in the recessed portions 30, a handgrip 32 having two hooks 33 at two opposite ends respectively inserted into the recessed portions 30 and hooked in the retaining holes 31, a lug 34 near the border, a through hole 35 adjacent to the lug 34, a hook 36 supported on a spring 37 and turned about a pivot (not shown) on the lug 34 and having a hooked front end 38 inserted through the through hole 35 for engaging one stop block 1J on the rim 11 to hook the cover 3, a gasket 3A mounted on the inside at the bottom, and plurality of retaining strips 39 raised from the inside wall around the border for engaging the retaining grooves 1K on the rim 11.

Figure 4:
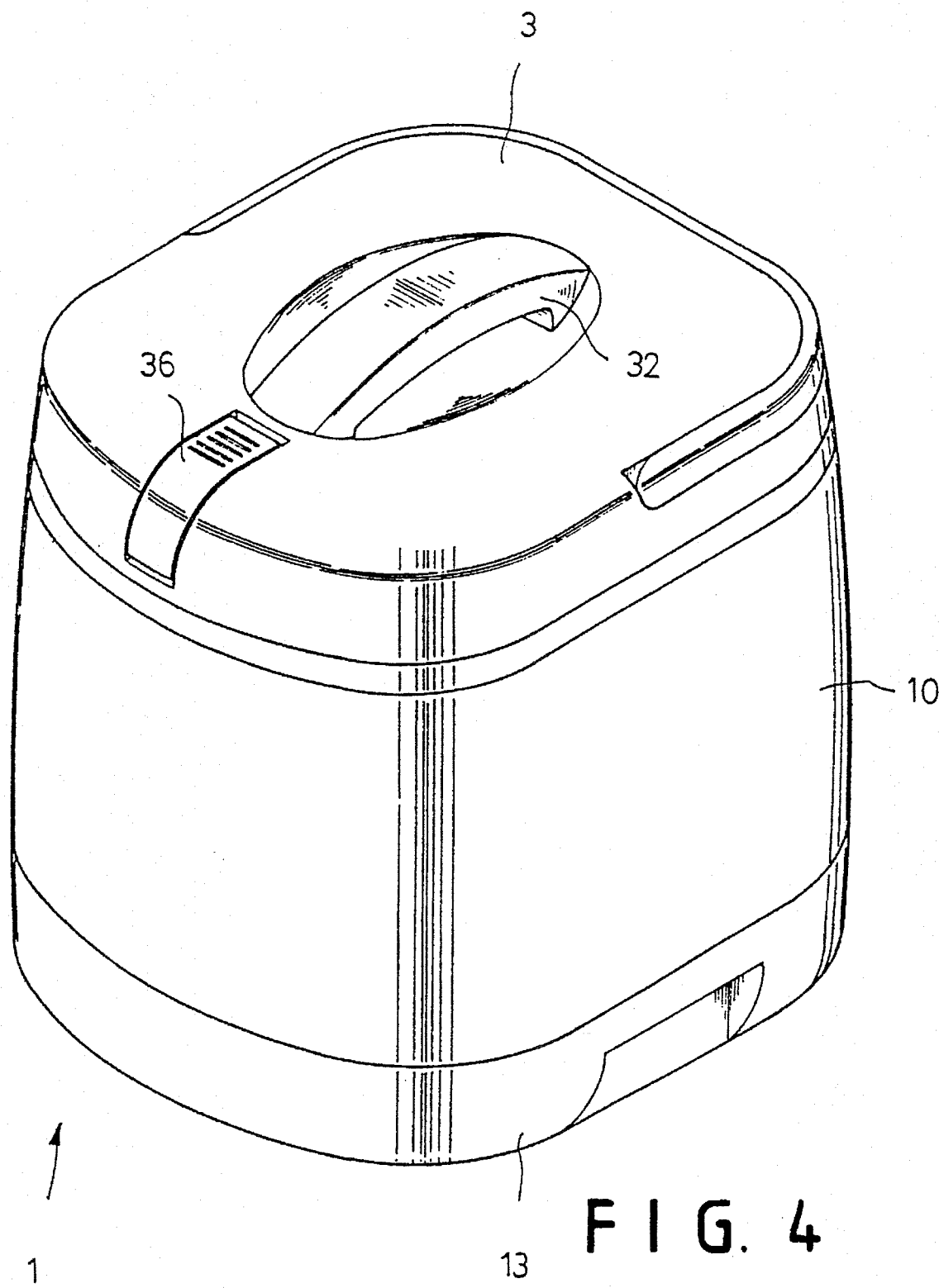
FIG. 4 is an elevational view of the thermal pot shown in FIG. 1.

Referring to FIGS. 3A, 3B, and 4, when the heat-insulative inner pot 2 is put in the heat-insulative housing 1, the cover 3 is covered on the heat-insulative housing 1 and turned through a certain angle, permitting the retaining strips 39 to be respectively engaged with the retaining grooves 1K on the rim 11. When the cover 3 is set into position, the hooked front end 38 of the hook 36 is forced by the spring 37 to hook on one stop block 1J, and therefore the cover 3 is locked. When the hook 36 is depressed to surpass the spring force of the spring 37, the cover 3 can be turned in the reversed direction and then lifted from the heat-insulative housing 1 for permitting the inner pot 2 to be removed from the heat-insulative housing 1.

It is to be understood that the drawings are designed for purposes of illustration only, and are not intended as a definition of the limits and scope of the invention disclosed.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A thermal pot of the type comprising a heat-insulative housing, a heat-insulative inner pot put in said heat-insulative housing, and a cover covered on said heat-insulative housing over said heat-insulative inner pot, wherein:

said heat-insulative housing comprises a hollow shell, a heat-insulative lining mounted around the inside wall of said hollow shell, a base covered on said hollow shell and said heat-insulative lining at a bottom side, and a rim fastened to said hollow shell and said heat-insulative lining at a top side by a connecting member, said hollow shell comprising an endless mounting groove around the topmost edge thereof, an endless mounting flange raised from the lowest bottom edge thereof, and an inside lip near the topmost edge, said base comprising an endless mounting groove fastened to the endless mounting flange on said hollow shell by ultrasonic welding, said rim comprising a downward mounting flange raised from a bottom side thereof and fastened to the endless mounting groove on said hollow shell by ultrasonic welding, a plurality of stop blocks and retaining grooves alternatively spaced around the periphery, an endless top mounting groove, an endless bottom mounting groove, and a top contact plate fastened to the top mounting groove on said rim, said heat-insulative lining having a coupling lip raised from a top side thereof, said connecting member comprising a first coupling portion fastened to the endless bottom mounting groove on said rim by ultrasonic welding, a second coupling portion coupled to the inside lip on said hollow shell, and a third coupling portion coupled to the top lip on said heat-insulative lining;

said heat-insulative inner pot has a pivoted handle at a top side thereof carrying by hand;

said cover comprises two recessed portions spaced at a top side thereof, two retaining holes respectively made in said recessed portions, a handgrip having two hooks at two opposite ends respectively inserted into said recessed portions and hooked in the retaining holes in said recessed portions, a lug near the border, a through hole adjacent to said lug, a pivot fixed to said lug, a spring, and a hook turned about said pivot and having one end supported on said spring and an opposite end inserted through said through hole for engaging one stop block on said rim to hook said cover in position, a gasket mounted on the inside for covering on said heat-insulative inner pot, and a plurality of retaining strips raised from an inside wall thereof around the border for engagement with the retaining grooves on said rim by rotating said cover relative to said rim.

\* \* \* \* \*